(12) United States Patent
Bohnen et al.

(10) Patent No.: US 7,202,190 B1
(45) Date of Patent: Apr. 10, 2007

(54) SUPPORTED CATALYST SYSTEM FOR THE POLYMERIZATION OF OLEFINS

(75) Inventors: Hans Bohnen, Moers (DE); Cornelia Fritze, Frankfurt (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/581,999

(22) PCT Filed: Dec. 10, 1998

(86) PCT No.: PCT/EP98/08050

§ 371 (c)(1),
(2), (4) Date: Jun. 21, 2000

(87) PCT Pub. No.: WO99/33881

PCT Pub. Date: Jul. 8, 1999

(30) Foreign Application Priority Data

Dec. 23, 1997 (DE) ................. 197 57 540

(51) Int. Cl.
C08F 4/64 (2006.01)
C08F 4/6392 (2006.01)
C08F 4/02 (2006.01)

(52) U.S. Cl. ............... 502/152; 502/104; 502/120; 502/128; 526/129; 526/133; 526/160; 526/943

(58) Field of Classification Search ........... 526/129, 526/132, 133, 160, 943; 502/120, 128, 152, 502/104

See application file for complete search history.

(56) References Cited

U.S. PATENT DOCUMENTS

| 5,017,714 | A | * | 5/1991 | Welborn, Jr. ............. 556/12 |
| 5,296,434 | A | * | 3/1994 | Karl et al. ................ 502/117 |
| 5,308,816 | A | * | 5/1994 | Tsutsui et al. ............ 502/108 |
| 5,444,134 | A | * | 8/1995 | Matsumoto ................ 526/159 |
| 5,543,481 | A | * | 8/1996 | Takeuchi et al. .......... 526/126 |
| 5,565,534 | A | | 10/1996 | Aulbach |
| 5,710,297 | A | | 1/1998 | Weller |
| 5,739,225 | A | * | 4/1998 | Tazaki et al. ............. 526/127 |
| 5,753,578 | A | * | 5/1998 | Santi et al. .............. 502/114 |
| 5,770,664 | A | * | 6/1998 | Okumura et al. .......... 526/127 |
| 5,770,753 | A | | 6/1998 | Kueber |
| 5,786,432 | A | | 7/1998 | Kueber |
| 5,840,644 | A | | 11/1998 | Kueber |
| 5,840,948 | A | | 11/1998 | Rohrmann |
| 5,852,142 | A | | 12/1998 | Rohrmann |
| 5,929,264 | A | | 7/1999 | Rohrmann |
| 5,939,347 | A | * | 8/1999 | Ward et al. .............. 502/104 |
| 5,990,254 | A | | 11/1999 | Weller |

FOREIGN PATENT DOCUMENTS

| EP | 107 127 | 5/1984 |
| EP | 416 815 | 3/1991 |
| EP | 520 732 | 12/1992 |
| EP | 545 304 | 6/1993 |
| EP | 558 158 | 9/1993 |
| EP | 561 479 | 9/1993 |
| EP | 576 970 | 1/1994 |
| EP | 632 063 | 1/1995 |
| EP | 636 636 | 2/1995 |
| EP | 659 758 | 6/1995 |
| EP | 661 300 | 7/1995 |
| EP | 727 443 | 8/1996 |
| WO | 91/09882 | 7/1991 |
| WO | 96/04319 | 2/1996 |
| WO | 96/23005 | 8/1996 |
| WO | 97/19959 | 6/1997 |

* cited by examiner

Primary Examiner—Caixia Lu
(74) Attorney, Agent, or Firm—Novak Druce & Quigg LLP

(57) ABSTRACT

A supported catalyst system for polymerizing olefins comprising
a) a support,
b) a Lewis base of the formula $$M^3R^6R^7R^8 \qquad (I)$$

wherein $M^3$ is an element of main group III of the Periodic Table of the Elements,
c) an organometallic compound of the formula II as cocatalyst, $$M^3R^6R^7R^8 \qquad (II)$$

wherein $M^3$ is an element of main group III of the Periodic Table of the Elements,
d) at least one metallocene,
e) an organometallic compound of the formula $$[M^4R^9_j]_k\text{III}$$

where $M^4$ is an element of main groups I, II or III of the Periodic Table of the Elements,
where the organometallic compound of the formula II is covalently bound to the support.

9 Claims, No Drawings

SUPPORTED CATALYST SYSTEM FOR THE POLYMERIZATION OF OLEFINS

The present invention relates to a supported catalyst system comprising at least one metal, a cocatalyst, a support material, a Lewis base and an organometallic compound. The catalyst system can advantageously be used for the polymerization of olefins. Here, aluminoxanes such as methylaluminoxane (MAO) are not used as cocatalyst but a high catalyst activity and good polymer morphology are nevertheless achieved.

The role of cationic complexes in the Ziegler-Natta polymerization using metallocenes is generally recognized (H. H. Brintzinger, D. Fischer, R. Mülhaupt, R. Rieger, R. Waymouth, Angew. Chem. 1995, 107, 1255–1283).

MAO as effective cocatalyst has the disadvantage of having to be used in a large excess. The preparation of cationic alkyl complexes opens up the route to MAO-free catalysts having comparable activity, with the cocatalyst being able to be used in virtually the stoichiometric amount.

The synthesis of "cation-like" metallocene polymerization catalysts is described in J. Am. Chem. Soc. 1991, 113, 3623. A process for preparing salts of the general form $LMX^+XA^-$ according to the above-described principle is claimed in EP 520 732.

EP 558158 describes zwitterionic catalyst systems which are prepared from metallocene-dialkyl compounds and salts of the form $[R_3NH]^+[B(C_6H_5)_4]^-$. The reaction of such a salt with, for example, $Cp_2ZrMe_2$ gives a zirconocene-methyl cation as intermediate by protolysis with elimination of methane. This cation reacts via C—H activation to give the zwitterion $Cp_2Zr^+$-$(m-C_6H_4)$—$BPh_3^-$. The Zr atom is covalently bound to a carbon atom of the phenyl ring and is stabilized by agostic hydrogen bonds.

U.S. Pat. No. 5,348,299 describes zwitterionic catalyst systems which are prepared from metallocene-dialkyl compounds and salts of the formula $[R_3NH]^+[B(C_6H_5)_4]$ by protolysis. The C—H-activation as subsequent reaction does not occur. EP 426 637 describes a process in which the Lewis-acid $CPh_3^+$ cation is used for abstracting the methyl group from the metal center. $B(C_6F_5)_4^-$ likewise functions as a weakly coordinating anion.

For industrial use of metallocene catalysts, application to a support is advantageous in order to influence the morphology of the resulting polymer. Application of cationic metallocene catalysts based on borate anions to a support is described in WO 9109882. Here, the catalyst system is formed by application of a dialkyl-metallocene compound and a Brönsted-acid, quaternary ammonium compound having a noncoordinating anion such as tetrakispentafluorophenylborate to an inorganic support. The support material is reacted beforehand with a trialkylaluminum compound.

A disadvantage of this method of application to a support is that only a small part of the metallocene used is fixed by physisorption to the support material. When the catalyst system is introduced into the reactor, the metallocene can easily be detached from the support surface. This leads to a partly homogeneous polymerization, which results in an unsatisfactory morphology of the polymer.

WO 96/04319 describes a catalyst system in which the cocatalyst is covalently bound to the support material. However, this catalyst system has a low polymerization activity; in addition, the high sensitivity of the supported cationic metallocene catalysts can lead to problems during introduction into the polymerization system.

It is an object of the present invention to provide a supported catalyst system which avoids the disadvantages of the prior art and nevertheless guarantees high polymerization activities and a good polymer morphology. An additional object is to develop a process for preparing a catalyst system which makes it possible to carry out the activation of the catalyst system either before introduction or only in the polymerization system.

We have found that these objects are achieved by a supported catalyst system and a process for preparing it. The catalyst system of the present invention comprises a) a support, b) a Lewis base of the formula I, c) and organometallic compound of the formula II as cocatalyst, d) at least one metallocene, e) an organometallic compound of the formula III, where the organometallic compound of the formula II is covalently bound to the support.

The catalyst system of the present invention is obtainable by a) reacting a Lewis base of the formula I and an organometallic compound of the formula II with a support and b) subsequently reacting the reaction product obtained in step a) (modified support material) with a solution or suspension comprising a metallocene compound and at least one organometallic compound of the formula III. The activation of the metallocene by reaction with the reaction product obtained in step a) can either be undertaken prior to introduction into the reactor or else be carried out only in the reactor. Furthermore, a process for preparing an olefin polymer is described. The addition of an additive, e.g. an antistatic, which is metered into the polymerization system can also be advantageous.

The support is a porous inorganic or organic solid. The support preferably comprises at least one inorganic oxide such as silicon oxide, aluminum oxide, aluminosilicates, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, or $Li_2O$, in particular silicon oxide and/or aluminum oxide. The support may also comprise at least one polymer, e.g. a homopolymer or copolymer, a crosslinked polymer or a polymer blend. Examples of polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal and polyvinyl alcohol.

The support has a specific surface area in the range from 10 to 1000 m²/g, preferably from 150 to 500 m²/g. The mean particle size of the support is from 1 to 500 μm, preferably from 5 to 350 μm.

The support is preferably porous with a pore volume of from 0.5 to 4.0 ml/g, preferably from 1.0 to 3.5 ml/g. A porous support has a proportion of voids (pore volume). The shape of the pores is usually irregular, frequently spherical. The pores can be connected to one another by small pore openings. The pore diameter is preferably from about 2 to 50 nm. The particle shape of the porous support can be irregular or spherical. The particle size of the support can be adjusted as desired, for example by cryogenic milling and/or sieving.

The Lewis base corresponds to the formula I, $$M^2R^3R^4R^5 \tag{1}$$

where $R^3$, $R^4$ and $R^5$ are identical or different and are each a hydrogen atom, a halogen atom or a $C_1$–$C_{20}$-alkyl-, $C_6$–$C_{40}$-aryl-, $C_7$–$C_{40}$-alkylaryl- or $C_7$–$C_{40}$-arylalkyl group. Furthermore, either two radicals or all three radicals $R^3$, $R^4$ and $R^5$ may be connected to one another via $C_2$–$C_{20}$ units.

$M^2$ is an element of main group V of the Periodic Table of the Elements, in particular nitrogen or phosphorus.

Examples of compounds of the formula I are:
triethylamine
triisopropylamine
triisobutylamine
tri(n-butyl)amine
N,N-dimethylaniline
N,N-diethylaniline
N,N-2,4,6-pentamethylaniline
dicyclohexylamine
pyridine
pyrazine
triphenylphosphine
tri(methylphenyl)phosphine
tri(dimethylphenyl)phosphine The organometallic compounds of the formula II are strong, uncharged Lewis acids

$$M^3 R^6 R^7 R^8 \qquad (II)$$

where $M^3$ is an element of main group III of the Periodic Table of the Elements, preferably boron or aluminum, and $R^6$, $R^7$ and $R^8$ may be identical or different and are each a hydrogen atom, a halogen atom or a halogen-containing $C_1$–$C_{40}$ group, for example $C_1$–$C_{40}$-haloalkyl, $C_6$–$C_{40}$-haloaryl, $C_7$–$C_{40}$-haloalkylaryl or $C_7$–$C_{40}$-haloarylalkyl, where at least one of the radicals $R^6$, $R^7$ and $R^8$ is a halogen-containing $C_1$–$C_{40}$ group.

Examples of preferred organometallic compounds of the formula II are trispentafluorophenylborane and trispentafluorophenylalane.

The organometallic compounds of the formula III are uncharged Lewis acids, $$[M^4 R^9{}_j]_k \qquad III$$

where $M^4$ is an element of main group I, II or III of the Periodic Table of the Elements. Preference is given to the elements magnesium and aluminum. Particular preference is given to aluminum.

The radicals $R^9$ may be identical or different and are each a hydrogen atom, a halogen atom or a $C_1$–$C_{40}$-hydrocarbon group such as a $C_1$–$C_{20}$-alkyl, $C_6$–$C_{40}$-aryl, $C_7$–$C_{40}$-arylalkyl or $C_7$–$C_{40}$-alkylaryl group.

j is an integer from 1 to 3 and k is an integer from 1 to 4.

Examples of preferred organometallic compounds of the formula III are
trimethylaluminum
triethylaluminum
triisopropylaluminum
trihexylaluminum
trioctylaluminum
tri-n-butylaluminum
tri-n-propylaluminum
triisoprenaluminum
dimethylaluminum monochloride
diethylaluminum monochloride
diisobutylaluminum monochloride
methylaluminum sesquichloride
ethylaluminum sesquichloride
dimethylaluminum hydride
diethylaluminum hydride
diisopropylaluminum hydride
dimethylaluminum trimethylsiloxide
dimethylaluminum triethylsiloxide
phenylalane
pentafluorophenylalane
o-tolylalane Metallocene compounds can be, for example, bridged or unbridged biscyclopentadienyl complexes as are described, for example, in EP 129 368, EP 561 479, EP 545 304 and EP 576 970, monocyclopentadienyl complexes such as bridged amidocyclopentadienyl complexes as described, for example, in EP 416 815, multinuclear cyclopentadienyl complexes as described in EP 632 063, ligand-substituted tetrahydropentalenes as described in EP 659 758 or ligand-substituted tetrahydroindenes as described in EP 661 300.

It is also possible to use organometallic compounds in which the complexing ligand contains no cyclopentadienyl ligands. Examples are diamine complexes of transition groups III and IV of the Periodic Table of the Elements, as are described, for example, in D. H. McConville, et al., Macromolecules, 1996, 29, 5241 and D. H. McConville, et al., J. Am. Chem. So., 1996, 118, 10008. Diimine complexes of transition group VIII of the Periodic Table of the Elements (e.g. $Ni^{2+}$ or $Pd^{2+}$ complexes) as are described in Brookhart et al., J. Am. Chem. So. 1995, 117, 6414 and Brookhart et al., J. Am. Chem. So., 1996, 118, 267 can also be used. Furthermore, it is possible to use 2,6-bis(imino)pyridyl complexes of transition group VIII of the Periodic Table of the Elements (e.g. $Co^{2+}$ or $Fe^{2+}$ complexes) as are described in Brookhart et al., J. Am. Chem. So. 1998, 120, 4049 and Gibson et al., Chem. Commun. 1998, 849.

Preferred metallocene compounds are unbridged or bridged compounds of the formula IV,

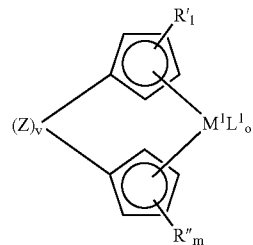

(IV)

where
$M^1$ is a metal of transition group III, IV, V or VI of the Periodic Table of the Elements, in particular Ti, Zr or Hf,
R' are identical or different and are each a hydrogen atom or $SiR_3^x$, where $R^x$ are identical or different and are each a hydrogen atom or a $C_1$–$C_{40}$ group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or R' is a $C_1$–$C_{30}$ group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals R' may be connected to one another so that the radicals R' and the atoms of the cyclopentadienyl ring which connect them form a $C_4$–$C_{24}$ ring system which may in turn be substituted, R" are identical or different and are each a hydrogen atom or $SiR_3^x$, where $R^x$ are identical or different and are each a hydrogen atom or a $C_1$–$C_{40}$ group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or R" is a $C_1$–$C_{30}$ group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, e.g. pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals R" may be connected to one another so that the radicals R" and the atoms of the cyclopentadienyl ring which connect them form a $C_4$–$C_{24}$ ring system which may in turn be substituted, l is 5 when v=0, and l is 4 when v=1, m is 5 when v=0, and m is 4 when v=1, $L^1$ may be identical or different and are each a hydrogen atom, a halogen atom or $OR^y$, $SR^y$, $OSiR_3^y$, $SiR_3^y$, $PR_2^y$ or $NR_2^y$, where $R^y$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $L^1$ is a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2, Z is a bridging structural element between the two cyclopentadienyl rings and v is 0 or 1.

Examples of Z are $M^2R^zR^z$=groups, where $M^2$ is carbon, silicon, germanium or tin and $R^z$ and $R^z$=are identical or different and are each a $C_1$–$C_{20}$-hydrocarbon-containing group such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o-$C_6H_4$ or 2,2'-$(C_6H_4)_2$. It is also possible for Z together with one or more radicals R' and/or R" to form a monocyclic or polycyclic ring system.

Preference is given to chiral bridged metallocene compounds of the formula IV, in particular those in which v is 1 and one or both cyclopentadienyl rings are substituted so that they form an indenyl ring. The indenyl ring is preferably substituted, in particular in the 2 position, 4 position, 2,4,5 positions, 2,4,6 positions, 2,4,7 positions or 2,4,5,6 positions, by $C_1$–$C_{20}$ groups such as $C_1$–$C_{10}$-alkyl or $C_6$–$C_{20}$-aryl, where two or more substituents of the indenyl ring may together also form a ring system.

Examples of metallocene compounds are:

dimethylsilanediylbis(indenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyl-4-(1-naphthyl)indenyl)zirconium dichloride
dimethylsilanediylbis(2-methyl-4-(2-naphthyl)indenyl)zirconium dichloride
dimethylsilanediylbis(2-methyl-4-phenylindenyl)zirconium dichloride
dimethylsilanediylbis(2-methyl-4-t-butylindenyl)zirconium dichloride
dimethylsilanediylbis(2-methyl-4-isopropylindenyl)zirconium dichloride
dimethylsilanediylbis(2-methyl-4-ethylindenyl)zirconium dichloride
dimethylsilanediylbis(2-methylacenaphthindenyl)zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl)zirconium dichloride
dimethylsilanediylbis(2-methyl-4,5-benzoindenyl)zirconium dichloride
dimethylsilanediylbis(2-methyl-4,6 diisopropylindenyl)zirconium dichloride
dimethylsilanediylbis(2-methyl-4,5 diisopropylindenyl)zirconium dichloride
dimethylsilanediylbis(2,4,6-trimethylindenyl)zirconium dichloride
dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl)zirconium dichloride
dimethylsilanediylbis(2-methyl-5-t-butylindenyl)zirconium dichloride
methyl(phenyl)silanediylbis(2-methyl-4-phenylindenyl)zirconium dichloride
methyl(phenyl)silanediylbis(2-methyl-4,6 diisopropylindenyl)zirconium dichloride
methyl(phenyl)silanediylbis(2-methyl-4-isopropylindenyl)zirconium dichloride
methyl(phenyl)silanediylbis(2-methyl-4,5-benzoindenyl)zirconium dichloride
methyl(phenyl)silanediylbis(2-methyl-4,5-(methylbenzo)indenyl)zirconium dichloride
methyl(phenyl)silanediylbis(2-methyl-4,5-(tetramethylbenzo)indenyl)zirconium dichloride
methyl(phenyl)silanediylbis(2-methyl-4-acenaphthindenyl)zirconium dichloride
methyl(phenyl)silanediylbis(2-methylindenyl)zirconium dichloride
methyl(phenyl)silanediylbis(2-methyl-5-isobutylindenyl)zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6 diisopropylindenyl)zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
[4-($0^5$-cyclopentadienyl)-4,6,6-trimethyl-($0^5$-4,5-tetrahydropentalene)]dichloro-zirconium
[4-($0^5$-3'-trimethylsilylcyclopentadienyl)-4,6,6-trimethyl-($0^5$-4,5-tetrahydro-pentalene)]dichlorozirconium

[4-($0^5$-3'-isopropylcyclopentadienyl)-4,6,6-trimethyl-($0^5$-4,5-tetrahydropentalene)]-dichlorozirconium
[4-($0^5$-cyclopentadienyl)-4,7,7-trimethyl-($0^5$-4,5,6,7-tetrahydroindenyl)]dichloro-titanium
[4-($0^5$-cyclopentadienyl)-4,7,7-trimethyl-($0^5$-4,5,6,7-tetrahydroindenyl)]dichloro-zirconium
[4-($0^5$-cyclopentadienyl)-4,7,7-trimethyl-($0^5$-4,5,6,7-tetrahydroindenyl)]dichloro-hafnium
[4-($0^5$-3-tert-butylcyclopentadienyl)-4,7,7-trimethyl-($0^5$-4,5,6,7-tetrahydro-indenyl)]dichlorotitanium
4-($0^5$-3-isopropylcyclopentadienyl)-4,7,7-trimethyl-($0^5$-4,5,6,7-tetrahydroindenyl)]-dichlorotitanium
4-($0^5$-3-methylcyclopentadienyl)-4,7,7-trimethyl-($0^5$-4,5,6,7-tetrahydroindenyl)]-dichlorotitanium
4-($0^5$-3-trimethylsilylcyclopentadienyl)-2-trimethylsilyl-4,7,7-trimethyl-($0^5$-4,5,6,7-tetrahydroindenyl)]dichlorotitanium
4-($0^5$-3-tert-butylcyclopentadienyl)-4,7,7-trimethyl-($0^5$-4,5,6,7-tetrahydroindenyl)]dichlorozirconium
(tert-butylamido)(tetramethyl-$0^5$-cyclopentadienyl)dimethylsilyldichlorotitanium
(tert-butylamido)(tetramethyl-$0^5$-cyclopentadienyl)-1,2-ethanediyldichlorotitanium-dichlorotitanium
(methylamido)(tetramethyl-$0^5$-cyclopentadienyl)dimethylsilyidichlorotitanium
(methylamido)-(tetramethyl-$0^5$-cyclopentadienyl)-1,2-ethanediyldichlorotitanium
(tert-butylamido)-(2,4-dimethyl-2,4-pentadien-1-yl)dimethylsilyidichlorotitanium
bis(cyclopentadienyl)zirconium dichloride
bis(n-butylcyclopentadienyl)zirconium dichloride
bis(1,3-dimethylcyclopentadienyl)zirconium dichloride
tetrachloro-[1-[bis($0^5$-1H-inden-1-ylidene)methylsilyl]-3-$0^5$-cyclopenta-2,4-dien-1-ylidene)-3-$0^5$-9H-fluoren-9-ylidene)butane]dizirconium
tetrachloro-[2-[bis($0^5$-2-methyl-1H-inden-1-ylidene)methoxysilyl]-5-($0^5$-2,3,4,5-tetramethylcyclopenta-2,4-dien-1-ylidene)-5-($0^5$-9H-fluoren-9-ylidene)hexane]-dizirconium
tetrachloro-[1-[bis($0^5$-1H-inden-1-ylidene)methylsilyl]-6-($0^5$-cyclopenta-2,4-dien-1-ylidene)-6-($0^5$-9H-fluoren-9-ylidene)-3-oxaheptane]dizirconium
dimethylsilanediylbis(indenyl)dimethylzirconium
dimethylsilanediylbis(4-naphthylindenyl)dimethylzirconium
dimethylsilanediylbis(2-methylbenzoindenyl)dimethylzirconium
dimethylsilanediylbis(2-methylindenyl)dimethylzirconium
dimethylsilanediylbis(2-methyl-4-(1-naphthyl)indenyl)dimethylzirconium
dimethylsilanediylbis(2-methyl-4-(2-naphthyl)indenyl)dimethylzirconium
dimethylsilanediylbis(2-methyl-4-phenylindenyl)dimethylzirconium
dimethylsilanediylbis(2-methyl-4-t-butylindenyl)dimethylzirconium
dimethylsilanediylbis(2-methyl-4-isopropylindenyl)dimethylzirconium
dimethylsilanediylbis(2-methyl-4-ethylindenyl)dimethylzirconium
dimethylsilanediylbis(2-methyl-4-acenaphthindenyl)dimethylzirconium
dimethylsilanediylbis(2,4-dimethylindenyl)dimethylzirconium
dimethylsilanediylbis(2-ethylindenyl)dimethylzirconium
dimethylsilanediylbis(2-ethyl-4-ethylindenyl)dimethylzirconium
dimethylsilanediylbis(2-ethyl-4-phenylindenyl)dimethylzirconium
dimethylsilanediylbis(2-methyl-4,6 diisopropylindenyl)dimethylzirconium
dimethylsilanediylbis(2-methyl-4,5 diisopropylindenyl)dimethylzirconium
dimethylsilanediylbis(2,4,6-trimethylindenyl)dimethylzirconium
dimethylsilanediylbis(2,5,6-trimethylindenyl)dimethylzirconium
dimethylsilanediylbis(2,4,7-trimethylindenyl)dimethylzirconium
dimethylsilanediylbis(2-methyl-5-t-butylindenyl)dimethylzirconium
methyl(phenyl)silanediylbis(2-methyl-4-phenylindenyl)dimethylzirconium
methyl(phenyl)silanediylbis(2-methyl-4,6 diisopropylindenyl)dimethylzirconium
methyl(phenyl)silanediylbis(2-methyl-4-isopropylindenyl)dimethylzirconium
methyl(phenyl)silanediylbis(2-methyl-4,5-benzoindenyl)dimethylzirconium
methyl(phenyl)silanediylbis(2-methyl-4,5-(methylbenzo)indenyl)dimethylzirconium
methyl(phenyl)silanediylbis(2-methyl-4,5-(tetramethylbenzo)indenyl)dimethyl-zirconium
methyl(phenyl)silanediylbis(2-methyl-4-acenaphthindenyl)dimethylzirconium
methyl(phenyl)silanediylbis(2-methyl-indenyl)dimethylzirconium
methyl(phenyl)silanediylbis(2-methyl-5-isobutylindenyl)dimethylzirconium
1,2-ethanediylbis(2-methyl-4-phenylindenyl)dimethylzirconium
1,4-butanediylbis(2-methyl-4-phenylindenyl)dimethylzirconium
1,2-ethanediylbis(2-methyl-4,6 diisopropylindenyl)dimethylzirconium
1,4-butanediylbis(2-methyl-4-isopropylindenyl)dimethylzirconium
1,4-butanediylbis(2-methyl-4,5-benzoindenyl)dimethylzirconium
1,2-ethanediylbis(2-methyl-4,5-benzoindenyl)dimethylzirconium
1,2-ethanediylbis(2,4,7-trimethylindenyl)dimethylzirconium
1,2-ethanediylbis(2-methylindenyl)dimethylzirconium
1,4-butanediylbis(2-methylindenyl)dimethylzirconium
[4-($0^5$-cyclopentadienyl)-4,6,6-trimethyl-($0^5$-4,5-tetrahydropentalene)]dimethyl-zirconium
[4-($0^5$-3'-trimethylsilylcyclopentadienyl)-4,6,6-trimethyl-($0^5$-4,5-tetrahydropentalene)]dimethylzirconium
[4-($0^5$-3'-isopropylcyclopentadienyl)-4,6,6-trimethyl-($0^5$-4,5-tetrahydropentalene)]-dimethylzirconium
[4-($0^5$-cyclopentadienyl)-4,7,7-trimethyl-($0^5$-4,5,6,7-tetrahydroindenyl)]-dimethyltitanium
[4-($0^5$-cyclopentadienyl)-4,7,7-trimethyl-($0^5$-4,5,6,7-tetrahydroindenyl)]-dimethyl-zirconium
[4-($0^5$-cyclopentadienyl)-4,7,7-trimethyl-($0^5$-4,5,6,7-tetrahydroindenyl)]-dimethylhafnium
[4-($0^5$-3-tert-butylcyclopentadienyl)-4,7,7-trimethyl-($0^5$-4,5,6,7-tetrahydroindenyl)]dimethyltitanium
4-($0^5$-3-isopropylcyclopentadienyl)-4,7,7-trimethyl-($0^5$-4,5,6,7-tetrahydroindenyl)]-dimethyltitanium
dimethylsilanediylbis(2-methyl-4-(4-tert-butylphenylindenyl)zirconium dichloride dimethylsilanediylbis(2-methyl-4-(4-methylphenylindenyl) zirconium dichloride
dimethylsilanediylbis(2-methyl-4-(4-ethylphenylindenyl) zirconium dichloride
dimethylsilanediylbis(2-methyl-4-(4-trifluoromethylphenylindenyl)zirconium dichloride
dimethylsilanediylbis(2-methyl-4-(4-methoxyphenylindenyl)zirconium dichloride
dimethylsilanediylbis(2-ethyl-4-(4-tert-butylphenylindenyl) zirconium dichloride
dimethylsilanediylbis(2-ethyl-4-(4-methylphenylindenyl) zirconium dichloride
dimethylsilanediylbis(2-ethyl-4-(4-ethylphenylindenyl)zirconium dichloride
dimethylsilanediylbis(2-ethyl-4-(4-trifluoromethylphenylindenyl)zirconium dichloride
dimethylsilanediylbis(2-ethyl-4-(4-methoxyphenylindenyl) zirconium dichloride
dimethylsilanediylbis(2-methyl-4-(4-tert-butylphenylindenyl)dimethylzirconium
dimethylsilanediylbis(2-methyl-4-(4-methylphenylindenyl) dimethylzirconium
dimethylsilanediylbis(2-methyl-4-(4-ethylphenylindenyl) dimethylzirconium
dimethylsilanediylbis(2-methyl-4-(4-trifluoromethylphenylindenyl)dimethyl-zirconium
dimethylsilanediylbis(2-methyl-4-(4-methoxyphenylindenyl)dimethylzirconium
dimethylsilanediylbis(2-ethyl-4-(4-tert-butylphenylindenyl) dimethylzirconium
dimethylsilanediylbis(2-ethyl-4-(4-methylphenylindenyl) dimethylzirconium
dimethylsilanediylbis(2-ethyl-4-(4-ethylphenylindenyl) dimethylzirconium
dimethylsilanediylbis(2-ethyl-4-(4-trifluoromethylphenylindenyl)dimethylzirconium
dimethylsilanediylbis(2-ethyl-4-(4-methoxyphenylindenyl) dimethylzirconium
dimethylsilanediylbis(2-methyl-4-(4'-tert-butylphenyl)indenyl)hafnium dichloride
dimethylsilanediylbis(2-methyl-4-(4'-tert-butylphenyl)indenyl)titanium dichloride
dimethylsilanediylbis(2-methyl-4-(4'-n-propylphenyl)indenyl)zirconium dichloride
dimethylsilanediylbis(2-methyl-4-(4'-isopropylphenyl)indenyl)zirconium dichloride
dimethylsilanediylbis(2-methyl-4-(4'-n-butylphenyl)indenyl)zirconium dichloride
dimethylsilanediylbis(2-methyl-4-(4'-hexylphenyl)indenyl) zirconium dichloride
dimethylsilanediylbis(2-methyl-4-(4'-sec-butylphenyl)indenyl)zirconium dichloride
dimethylsilanediylbis(2-ethyl-4-(4'-n-propylphenyl)indenyl)zirconium dichloride
dimethylsilanediylbis(2-ethyl-4-(4'-isopropylphenyl)indenyl)zirconium dichloride
dimethylsilanediylbis(2-ethyl-4-(4'-n-butylphenyl)indenyl) zirconium dichloride
dimethylsilanediylbis(2-ethyl-4-(4'-hexylphenyl)indenyl) zirconium dichloride
dimethylsilanediylbis(2-ethyl-4-(4'-pentylphenyl)indenyl) zirconium dichloride
dimethylsilanediylbis(2-ethyl-4-(4'-cyclohexylphenyl)indenyl)zirconium dichloride
dimethylsilanediylbis(2-ethyl-4-(4'-sec-butylphenyl)indenyl)zirconium dichloride
dimethylsilanediylbis(2-n-propyl-4-phenyl)indenyl)zirconium dichloride
dimethylsilanediylbis(2-n-propyl-4-(4'-methylphenyl)indenyl)zirconium dichloride
dimethylsilanediylbis(2-n-propyl-4-(4'-ethylphenyl)indenyl)zirconium dichloride
dimethylsilanediylbis(2-n-propyl-4-(4'-n-propylphenyl)indenyl)zirconium dichloride
dimethylsilanediylbis(2-n-propyl-4-(4'-isopropylphenyl)indenyl)zirconium dichloride
dimethylsilanediylbis(2-n-propyl-4-(4'-n-butylphenyl)indenyl)zirconium dichloride
dimethylsilanediylbis(2-n-propyl-4-(4'-hexylphenyl)indenyl)zirconium dichloride
dimethylsilanediylbis(2-n-propyl-4-(4'-cyclohexylphenyl) indenyl)zirconium dichloride
dimethylsilanediylbis(2-n-propyl-4-(4'-sec-butylphenyl)indenyl)zirconium dichloride
dimethylsilanediylbis(2-n-propyl-4-(4'-tert-butylphenyl)indenyl)zirconium dichloride
dimethylsilanediylbis(2-n-butyl-4-phenyl)indenyl)zirconium dichloride
dimethylsilanediylbis(2-n-butyl-4-(4'-methylphenyl)indenyl)zirconium dichloride
dimethylsilanediylbis(2-n-butyl-4-(4'-ethylphenyl)indenyl) zirconium dichloride
dimethylsilanediylbis(2-n-butyl-4-(4'-n-propylphenyl)indenyl)zirconium dichloride
dimethylsilanediylbis(2-n-butyl-4-(4'-isopropylphenyl)indenyl)zirconium dichloride
dimethylsilanediylbis(2-n-butyl-4-(4'-n-butylphenyl)indenyl)zirconium dichloride
dimethylsilanediylbis(2-n-butyl-4-(4'-hexylphenyl)indenyl) zirconium dichloride
dimethylsilanediylbis(2-n-butyl-4-(4'-cyclohexylphenyl)indenyl)zirconium dichloride
dimethylsilanediylbis(2-n-butyl-4-(4'-sec-butylphenyl)indenyl)zirconium dichloride
dimethylsilanediylbis(2-n-butyl-4-(4'-tert-butylphenyl)indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl) zirconium dichloride
dimethylsilanediylbis(2-hexyl-4-(4'-ethylphenyl)indenyl) zirconium dichloride
dimethylsilanediylbis(2-hexyl-4-(4'-n-propylphenyl)indenyl)zirconium dichloride
dimethylsilanediylbis(2-hexyl-4-(4'-isopropylphenyl)indenyl)zirconium dichloride
dimethylsilanediylbis(2-hexyl-4-(4'-n-butylphenyl)indenyl) zirconium dichloride
dimethylsilanediylbis(2-hexyl-4-(4'-hexylphenyl)indenyl) zirconium dichloride
dimethylsilanediylbis(2-hexyl-4-(4'-cyclohexylphenyl)indenyl)zirconium dichloride
dimethylsilanediylbis(2-hexyl-4-(4'-sec-butylphenyl)indenyl)zirconium dichloride
dimethylsilanediylbis(2-hexyl-4-(4'-tert-butylphenyl)indenyl)zirconium dichloride
dimethylsilanediylbis(2-methyl-4-(4'-tert-butylphenyl)indenyl)zirconium bis(dimethylamide)
dimethylsilanediylbis(2-ethyl-4-(4'-tert-butylphenyl)indenyl)dibenzylzirconium
dimethylsilanediylbis(2-methyl-4-(4'-tert-butylphenyl)indenyl)dimethylzirconium dimethylgermanediylbis(2-ethyl-4-(4'-tert-butylphenyl)indenyl)zirconium dichloride
dimethylgermanediylbis(2-ethyl-4-(4'-tert-butylphenyl)indenyl)hafnium dichloride
dimethylgermanediylbis(2-propyl-4-(4'-tert-butylphenyl)indenyl)titanium dichloride
dimethylgermanediylbis(2-methyl-4-(4'-tert-butylphenyl)indenyl)zirconium dichloride
ethylidenebis(2-ethyl-4-phenyl)indenyl)zirconium dichloride
ethylidenebis(2-ethyl-4-(4'-tert-butylphenyl)indenyl)zirconium dichloride
ethylidenebis(2-n-propyl-4-(4'-tert-butylphenyl)indenyl)zirconium dichloride
ethylidenebis(2-n-butyl-4-(4'-tert-butylphenyl)indenyl)titanium dichloride
ethylidenebis(2-hexyl-4-(4'-tert-butylphenyl)indenyl)dibenzylzirconium
ethylidenebis(2-ethyl-4-(4'-tert-butylphenyl)indenyl)dibenzylhafnium
ethylidenebis(2-methyl-4-(4'-tert-butylphenyl)indenyl) dibenzyltitanium
ethylidenebis(2-methyl-4-(4'-tert-butylphenyl)indenyl)zirconium dichloride
ethylidenebis(2-ethyl-4-(4'-tert-butylphenyl)indenyl)dimethylhafnium
ethylidenebis(2-n-propyl-4-phenyl)indenyl)dimethyltitanium
ethylidenebis(2-ethyl-4-(4'-tert-butylphenyl)indenyl)zirconium bis(dimethylamide)
ethylidenebis(2-ethyl-4-(4'-tert-butylphenyl)indenyl) hafnium bis(dimethylamide)
ethylidenebis(2-ethyl-4-(4'-tert-butylphenyl)indenyl)titanium bis(dimethylamide)
methylethylidenebis(2-ethyl-4-(4'-tert-butylphenyl)indenyl) zirconium dichloride
methylethylidenebis(2-ethyl-4-(4'-tert-butylphenyl)indenyl) hafnium dichloride
phenylphosphinediyl(2-ethyl-4-(4'-tert-butylphenyl)indenyl)zirconium dichloride
phenylphosphinediyl(2-methyl-4-(4'-tert-butylphenyl)indenyl)zirconium dichloride
phenylphosphinediyl(2-ethyl-4-(4'-tert-butylphenyl)indenyl)zirconium dichloride Preference is also given to the corresponding dimethylzirconium compounds and the corresponding zirconium-$\eta^4$-butadiene compounds, and also the corresponding compounds having 1,2-(1-methylethanediyl), 1,2-(1,1-dimethylethanediyl) and 1,2-(1,2-dimethylethanediyl) bridges.

To prepare the catalyst system of the present invention, the support material is suspended in an organic solvent. Suitable solvents a re aromatic or aliphatic solvents, for example hexane, heptane, dodecane, toluene or xylene, or halogenated hydrocarbons such as methylene chloride or halogenated aromatic hydrocarbons such as o-dichlorobenzene. The support can be pretreated beforehand with an organometallic compound of the formula III. Subsequently, one or more Lewis bases of the formula I is/are added to this suspension, with the reaction time being able to be from 1 minute to 48 hours, preferably from 10 minutes to 2 hours. The reaction solution can be isolated and then resuspended or else can be directly reacted further with an organometallic compound of the formula II. The reaction time is from 1 minute to 48 hours, preferably from 10 minutes to 2 hours. The catalyst system of the present invention can be prepared by reacting one or more Lewis bases of the formula I in any stoichiometric ratio with one or more organometallic compounds of the formula II. Preference is given to using from 1 to 4 equivalents of a Lewis base of the formula I per equivalent of an organometallic compound of the formula II. Particular preference is given to using one equivalent of a Lewis base of the formula I per equivalent of an organometallic compound of the formula II. The reaction product of this reaction is a metallocenium-forming compound which is fixed covalently to the support material. It will hereinafter be referred to as the modified support material. The reaction solution is subsequently filtered and the solid is washed with one of the abovementioned solvents. The modified support material is then dried under reduced pressure.

The reaction of the mixture of one or more metallocene compounds of, for example, the formula IV and one or more organometallic compounds of the formula III with the modified support material is preferably carried out by dissolving or suspending one or more metallocene compounds of, for example, the formula IV in one of the above-described solvents and subsequently reacting it with one or more organometallic compounds of the formula III which is likewise preferably dissolved or suspended. The stoichiometric ratio of metallocene compound of, for example, the formula IV to an organometallic compound of the formula III is preferably from 100:1 to $10^{-4}$:1. The ratio is preferably from 1:1 to $10^{-2}$:1.

The modified support material can be reacted with a mixture of a metallocene compound of the formula IV and an organometallic compound of the formula III either directly in the polymerization reactor or in a separate reaction vessel prior to addition to the polymerization reactor. The addition of an organometallic compound of the formula III has a positive influence on the activity of the catalyst system. Polymerization catalysts comprising a modified support material as described above and a metallocene compound of, for example, the formula IV display significantly lower activities than the catalyst system of the present invention which comprises a mixture of the above-described modified support material, a metallocene compound of, for example, the formula IV and an organometallic compound of the formula III.

The ratio of modified support to a metallocene compound of, for example, the formula IV is preferably from 10 g:1 mol to $10^{-3}$:1 mol. The stoichiometric ratio of metallocene compound of, for example, the formula IV to the organometallic compound of the formula II fixed to the support is from 100:1 to $10^{-4}$:1, preferably from 1:1 bis $10^{-2}$:1.

The supported catalyst system can be used directly for polymerization. However, it is also possible to remove the solvent and resuspend it for use in the polymerization. The advantage of this activation method is that it offers the option of allowing the polymerization-active catalyst system to be formed only in the reactor. This prevents partial decomposition from occurring when introducing the air-sensitive catalyst.

The present invention also provides a process for preparing an olefin polymer by polymerization of one or more olefins in the presence of the catalyst system of the present invention. The polymerization can be a homopolymerization or a copolymerization.

Preference is given to polymerizing olefins of the formula R"—CH═CH—R$^$, where R" and R$^$ are identical or different and are each a hydrogen atom, a halogen atom, an alkoxy, hydroxy, alkylhydroxy, aldehyde, carboxyl or carboxylic ester group or a saturated or unsaturated hydrocarbon radical having from 1 to 20 carbon atoms, in particular from 1 to 10 carbon atoms, which may be substituted by an alkoxy, hydroxy, alkylhydroxy, aldehyde, carboxyl or carboxylic ester group, or R" and R$^$ together with the atoms which connect them form one or more rings. Examples of such olefins are 1-olefins such as ethylene, propylene, 1-butene, 1-hexene, 4-methyl-1-pentene, 1-octene or styrene, cyclic olefins such as norbornene, vinylnorbornene, tetracyclododecene or ethylidenenorbornene, dienes such as 1,3-butadiene or 1,4-hexadiene, biscyclopentadiene or methyl methacrylate.

In particular, propylene or ethylene are homopolymerized, ethylene is copolymerized with one or more $C_3$–$C_{20}$-1-olefins, in particular propylene, and/or one or more $C_4$–$C_{20}$-dienes, in particular 1,3-butadiene, or norbornene and ethylene are copolymerized.

The polymerization is preferably carried out at from –60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported catalyst system can either be formed directly in the polymerization system or it can be resuspended as powder or still moist with solvent and introduced as a suspension in an inert suspension medium into the polymerization system.

To prepare olefin polymers having a broad molecular weight distribution, preference is given to using catalyst systems which comprise two or more different transition metal compounds, e.g. metallocenes.

To remove catalyst poisons present in the olefin, purification using an aluminum alkyl, for example trimethylaluminum, triethylaluminum or triisobutylaluminum, is advantageous. This purification can either be carried out in the polymerization system itself or the olefin is brought into contact with the Al compound and is subsequently separated off again prior to introduction into the polymerization system.

If necessary, hydrogen is added as molar mass regulator and/or to increase the activity. The total pressure in the polymerization system is from 0.5 to 2500 bar, preferably from 2 to 1500 bar.

The compound used according to the present invention is employed in a concentration, based on the transition metal, of preferably from $10^{-3}$ to $10^{-8}$ mol, more preferably from $10^{-4}$ to $10^{-7}$ mol, of transition metal per dm$^3$ of solvent or per dm$^3$ of reactor volume.

Suitable solvents for preparing both the supported chemical compound of the present invention and the catalyst system of the present invention are aliphatic or aromatic solvents, for example hexane or toluene, ether solvents, for example tetrahydrofuran or diethyl ether, or halogenated hydrocarbons, for example methylene chloride, or halogenated aromatic hydrocarbons, for example o-dichlorobenzene.

Before addition of the catalyst system comprising at least one supported chemical compound of the present invention and at least one transition metal compound (e.g. a metallocene), it is also possible to add another alkylaluminum compound such as trimethylaluminum, triethylaluminum, triisobutylaluminum, trioctylaluminum or isoprenylaluminum to the reactor so as to make the polymerization system inert (for example to remove catalyst poisons present in the olefin). This additional compound is added to the polymerization system in a concentration of from 100 to 0.01 mmol of Al per kg of reactor contents.

Preference is given to using triisobutylaluminum and triethylaluminum in a concentration of from 200 to 0.001 mmol of Al per kg of reactor contents, which enables a small Al/M molar ratio to be chosen in the synthesis of a supported catalyst system.

Furthermore, it is possible to use an additive such as an antistatic in the process of the present invention, for example to improve the particle morphology of the olefin polymer. It is generally possible to use all antistatics which are suitable for polymerization. Examples are salt mixtures of calcium salts of medialanic acid and chromium salts of N-stearylanthranilic acid as described in DE-A-3543360. Further suitable antistatics are, for example, $C_{12}$–$C_{22}$-fatty acid soaps of alkali metals or alkaline earth metals, salts of sulfonic esters, esters of polyethylene glycols with fatty acids, polyoxyethylene alkyl ethers, etc. A review of antistatics is given in EP-A 107127.

It is also possible to use a mixture of a metal salt of medialanic acid, a metal salt of anthranilic acid and a polyamine as antistatic, as described in EP-A 636636.

Commercially available products such as Stadis® 450 from DuPont, namely a mixture of toluene, isopropanol, dodecylbenzenesulfonic acid, a polyamine, a copolymer of 1-decene and $SO_2$ and also 1-decene, or ASA®-3 from Shell and ARU5R® 163 from ICI can likewise be used.

The antistatic is preferably used as a solution; in the preferred case of Stadis® 450, preference is given to using from 1 to 50% by weight of this solution, more preferably from 5 to 25% by weight, based on the mass of the supported catalyst used (support together with covalently fixed metallocenium-forming compound and one or more metallocene compounds of, for example, the formula IV). However, the amounts of antistatic required can, depending on the type of antistatic used, vary within a wide range.

The actual polymerization is preferably carried out in the liquid monomer (bulk) or in the gas phase.

The antistatic can be introduced into the polymerization at any point in time. For example, a preferred procedure is to resuspend the supported catalyst system in an organic solvent, preferably an alkane such as heptane or isododecane. This is subsequently added while stirring to the polymerization autoclave. The antistatic is then introduced. The polymerization is carried out at from 0 to 100° C. A further preferred procedure is to introduce the antistatic into the polymerization autoclave prior to addition of the supported catalyst system. The resuspended supported catalyst system is subsequently introduced while stirring at from 0 to 100° C. The polymerization time can be in the range from 0.01 to 24 hours. Preference is given to a polymerization time in the range from 0.1 to 5 hours.

In the process of the present invention, no deposits are formed in the reactor, no agglomerates are formed and the productivity of the catalyst system used is high. The polymers prepared by the process of the present invention have a narrow molecular weight distribution and a good particle morphology.

The following examples illustrate the invention but do not restrict its scope.

EXAMPLE 1

Preparation of a Modified Support 5 g of $SiO_2$ (PQ MS 3030, pretreated at 140° C., 10 mbar, 10 h) were suspended in 30 ml of toluene. 0.25 ml of N,N-dimethylaniline were added to this suspension and the reaction mixture was stirred for 1 hour. The reaction mixture was then admixed with 1.02 g of tris(pentafluorophenyl) borane and stirred for one hour. The reaction mixture was filtered and washed three times with toluene. Residual solvent was removed from the residue in an oil pump vacuum.

EXAMPLE 2

Preparation of Catalyst A 8.3 mg of dimethylsilylenebis(2-methylindenyl)dimethylzirconium were dissolved in 3 ml of toluene and admixed with 1 ml of 20% strength trimethylaluminum solution in Varsol. 1 g of the modified support was added thereto, the mixture was stirred for one hour and residual solvent was removed in an oil pump vacuum. This gave 1.15 g of a free-flowing supported catalyst.

EXAMPLE 3

Polymerization of Propene

A dry 16 dm$^3$ reactor was flushed firstly with nitrogen and subsequently with propylene and charged with 10 dm$^3$ of liquid propylene.

4 cm$^3$ of a 20% strength triisobutylaluminum solution in Varsol diluted with 30 cm$^3$ of heptane were then introduced into the reactor and the mixture was stirred at 30° C. for 15 minutes.

Subsequently, the catalyst from Example 2 was resuspended in heptane and this suspension was introduced into the reactor. The reaction mixture was heated to the polymerization temperature 65° C. (4° C./min) and the polymerization system was maintained at 65° C. for 1 hour by cooling. The polymerization was stopped by venting the remaining propylene. The polymer was dried in a vacuum drying oven.

This gave 1.1 kg of polypropylene powder. The reactor displayed no deposits on the inner wall or stirrer. The catalyst activity was 132 kg of PP/g of metallocene×h.

EXAMPLE 4

Preparation of Catalyst B 8.3 mg of dimethylsilylenebis(2-methylindenyl)dimethylzirconium were dissolved in 3 ml of toluene. 1 g of the modified support was added to this, the mixture was stirred for one hour and residual solvent was were removed in an oil pump vacuum. This gave 1.05 g of a free-flowing supported catalyst.

EXAMPLE 5

Polymerization of Propene

A dry 16 dm$^3$ reactor was flushed firstly with nitrogen and subsequently with propylene and charged with 10 dm$^3$ of liquid propylene.

4 cm$^3$ of a 20% strength triisobutylaluminum solution in Varsol diluted with 30 cm$^3$ of heptane were then introduced into the reactor and the mixture was stirred at 30° C. for 15 minutes.

Subsequently, the catalyst from Example 4 was resuspended in heptane and this suspension was introduced into the reactor. The reaction mixture was heated to the polymerization temperature of 65° C. (40° C./min) and the polymerization system was maintained at 65° C. for 1 hour by cooling. The polymerization was stopped by venting the remaining propylene. The polymer was dried in a vacuum drying oven.

This gave 0.33 kg of polypropylene powder. The reactor displayed no deposits on the inner wall or stirrer. The catalyst activity was 40 kg of PP/g of metallocene×h.

EXAMPLE 6

Preparation of Catalyst C 9.1 mg of dimethylsilylenebis(2-methylindenyl)zirconium dichloride were dissolved in 3 ml of toluene and admixed with 1 ml of 20% strength trimethylaluminum solution in Varsol. 1 g of the modified support was added to this, the mixture was stirred for one hour and residual solvent was were removed in an oil pump vacuum. This gave 1.16 g of a free-flowing supported catalyst.

EXAMPLE 7

Polymerization of Propene

A dry 16 dm$^3$ reactor was flushed firstly with nitrogen and subsequently with propylene and charged with 10 dm$^3$ of liquid propylene.

4 cm$^3$ of a 20% strength triisobutylaluminum solution in Varsol diluted with 30 cm$^3$ of heptane were then introduced into the reactor and the mixture was stirred at 30° C. for 15 minutes. Subsequently, the catalyst from Example 6 was resuspended in heptane and this suspension was introduced into the reactor. The reaction mixture was heated to the polymerization temperature of 65° C. (4° C./min) and the polymerization system was maintained at 65° C. for 1 hour by cooling. The polymerization was stopped by venting the remaining propylene. The polymer was dried in a vacuum drying oven.

This gave 1.0 kg of polypropylene powder. The reactor displayed no deposits on the inner wall or stirrer. The catalyst activity was 118 kg of PP/g of metallocene×h.

We claim:

1. A process for preparing an isolated supported catalyst system which does not contain an aluminoxane comprising
 a) reacting a Lewis base of the formula I, $$M^2R^3R^4R^5 \qquad (I)$$

where
  $R^3$, $R^4$ and $R^5$ are identical or different and are each a hydrogen atom, a halogen atom, a $C_1$–$C_{20}$-alkyl, $C_6$–$C_{40}$-aryl, $C_7$–$C_{40}$-alkylaryl or $C_7$–$C_{40}$-arylalkyl group and/or two radicals or all three radicals $R^3$, $R^4$ and $R^5$ are connected to one another via $C_2$–$C_{20}$ units, and
  $M^2$ is an element of main group V of the Periodic Table of the Elements, and an organometallic compound of the formula II $$M^3R^6R^7R^8 \qquad (II)$$

where
  $M^3$ is an element of main group III of the Periodic Table of the Elements and
  $R^6$, $R^7$ and $R^9$ are identical or different and are each a hydrogen atom, a halogen atom or a halogen-containing $C_1$–$C_{40}$ group, where at least one of the radicals $R^6$, $R^7$ and $R^8$ is a halogen-containing $C_1$–$C_{40}$ group, with a support, and b) subsequently reacting the product with a solution or suspension obtained by reacting in a solvent at least one metallocene compound of the formula IV

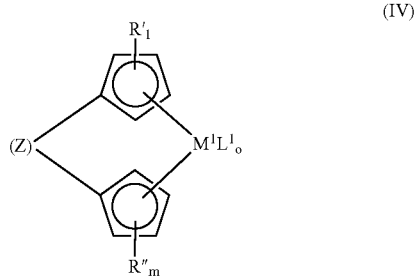

where

M$^1$ is a metal of transition group III, IV, V or VI of the Periodic table of the Elements, R' are identical or different and are each a hydrogen atom or SiR$_3^x$, where R$^x$ are identical or different and are each a hydrogen atom or a C$_1$–C$_{40}$ group, or R' is a C$_1$–C$_{30}$ group or two or more radicals R' may be connected to one another so that the radicals R' and the atoms of the cyclopentadienyl ring which connect them form a C$_4$–C$_{24}$ ring system which may in turn be substituted, R" are identical or different and are each a hydrogen atom or SiR$_3^x$, where R$^x$ are identical or different and are each a hydrogen atom or a C$_1$–C$_{40}$ group, or R" is a C$_1$–C$_{30}$ group or two or more radicals R" may be connected to one another so that the radicals R" and the atoms of the cyclopentadienyl ring which connect them form a C$_4$–C$_{24}$ ring system which may in turn be substituted, l is 4, m is 4, L$^1$ are identical or different and are each a hydrogen atom, OR$^y$, SR$^y$, OSiR$_3^y$, SiR$_3^y$, PR$_2^y$ or NR$_2^y$, where R$^y$ is a halogen atom, a C$_1$–C$_{10}$-alkyl group, a halogenated C$_1$–C$_{10}$-alkyl group, a C$_6$–C$_{20}$-aryl group or a halogenated C$_6$–C$_{20}$-aryl group, or L$^1$ is a toluenesulfonyl, trifluoroacetyl, trifluoromethanesulfonyl, nonafluorobutanesulfonyl or 2,2,2-trifluoroethenesulfonyl group, o is an integer from 1 to 4, Z is a bridging structural element between the two cyclopentadienyl rings, with at least one organometallic compound of the formula III

[M$^4$R$^9_j$]$_k$   III where

M$^4$ is an element of main group I, II or III of the Periodic Table of the Elements and the radicals R$^9$ are identical or different and are each a hydrogen atom, a halogen atom or a C$_1$–C$_{40}$-hydrocarbon group and j is an integer from 1 to 3 and k is an integer from 1 to 4, wherein the metallocene compound (IV) is a chiral and bridged monoindenyl or chiral and bridged bisindenyl compound in which the indenyl ring is substituted by at least one substituent in addition to the bridge, and c) subsequently isolating the supported catalyst system by removing residual solvent.

2. The process of claim 1, wherein the molar ratio of metallocene to organometallic III is 1:1 to 10$^{-2}$:1.

3. The process of claim 1, wherein substituents L$^1$ of the metallocene compound of the formula IV are identical or different and are each a hydrogen atom, SiR$_3^y$, PR$_2^y$ or NR$_2^y$, wherein R$^y$ represents a halogen atom, a C$_1$–C$_{10}$-alkyl group, a halogenated C$_1$–C$_{10}$-alkyl group, a C$_6$–C$_{20}$-aryl group or a halogenated C$_6$–C$_{20}$-aryl group.

4. A process of preparing an isolated supported catalyst system which does not contain an aluminoxane comprising a) reacting a Lewis base of the formula I,

M$^2$R$^3$R$^4$R$^5$   (I)

where

R$^3$, R$^4$ and R$^5$ are identical or different and are each a hydrogen atom, a halogen atom, a C$_2$–C$_{20}$-alkyl C$_6$–C$_{40}$-aryl, C$_7$–C$_{40}$-alkylaryl or C$_7$–C$_{40}$-arylalkyl group and/or two radicals or all three radicals R$^3$, R$^4$ and R$^5$ are connected to one another via C$_2$–C$_{20}$ units, and M$^2$ is an element of main group V of the Periodic Table of the Elements, and an organometallic compound of the formula II

M$^3$R$^6$R$^7$R$^8$   (II)

where

M$^3$ is an element of main group III of the Periodic Table of the Elements and

R$^6$, R$^7$ and R$^8$ are identical or different and are each a hydrogen atom, a halogen atom or a halogen-containing C$_1$–C$_{40}$ group, where at least one of the radicals R$^6$, R$^7$ and R$^8$ is a halogen-containing C$_1$–C$_{40}$ group, with a support, and b) subsequently reacting the product with a solution or suspension obtained by reacting in a solvent metallocene wherein the metal in the metallocene contains no halogen atoms bonded directed thereto with at least one organometallic compound of the formula III

[M$^4$R$^9_j$]$_k$   III where

M$^4$ is an element of main group I, II or III of the Periodic Table of the Elements and the radicals R$^9$ are identical or different and are each a hydrogen atom, a halogen atom or a C$_1$–C$_{40}$-hydrocarbon group and j is an integer from 1 to 3 and k is an integer from 1 to 4, and c) subsequently isolating the supported catalyst system by removing residual solvent, wherein the metallocene metal is coordinated with one or two cyclopentadienyl ligands, and any additional ligands which are bonded to the metallocene metal are independent from one another selected from the group consisting of: hydrogen, SiR$_3^y$, PR$_2^y$ and NR$_2^y$, wherein R$^y$ represents a halogen atom, a C$_1$–C$_{10}$-alkyl group, a halogenated C$_1$–C$_{10}$-alkyl group, a C$_6$–C$_{20}$-aryl group or a halogenated C$_6$–C$_{20}$-aryl group.

5. The process of claim 4, wherein the metallocene is an unbridged or bridged cyclopentadienyl or biscyclopentadienyl complex.

6. The process of claim 4, wherein one or both cyclopentadienyl rings are optionally substituted.

7. The process of claim 4, wherein one or both cyclopentadienyl rings are part of an optionally substituted indenyl ring.

8. The process of claim 3, wherein the molar ratio of metallocene to organometallic III is 1:1 to $10^{-2}$:1.

9. The process of claim 4, wherein the molar ratio of metallocene to organometallic III is 1:1 to $10^{-2}$:1.

* * * * *

UNITED STATES PATENT AND TRADEMARK OFFICE
CERTIFICATE OF CORRECTION

PATENT NO. : 7,202,190 B1
APPLICATION NO. : 09/581999
DATED : April 10, 2007
INVENTOR(S) : Bohmen et al.

It is certified that error appears in the above-identified patent and that said Letters Patent is hereby corrected as shown below:

Claim 1, column 16, indicated line 63:
"$R^9$" should read --$R^8$--

Claim 1, column 17, indicated line 38:
"I is 4" should read --l is 4--

Claim 4, column 18, indicated line 20:
"$C_2$-$C_{20}$-alkyl" should read --$C_1$-$C_{20}$-alkyl--

Signed and Sealed this

Seventeenth Day of July, 2007

JON W. DUDAS
*Director of the United States Patent and Trademark Office*